(12) United States Patent
Mason et al.

(10) Patent No.: US 8,376,400 B2
(45) Date of Patent: Feb. 19, 2013

(54) GAS GENERATING SYSTEM

(75) Inventors: Scott A. Mason, St. Clair, MI (US);
David M. McCormick, St. Clair Shores, MI (US); Richard W. Morgan, Lake Orion, MI (US); Jeffrey Anderson, Clinton Township, MI (US)

(73) Assignee: TK Holdings, Inc., Armada, MI (US)

( * ) Notice: Subject to any disclaimer, the term of this patent is extended or adjusted under 35 U.S.C. 154(b) by 144 days.

(21) Appl. No.: 11/788,813

(22) Filed: Apr. 20, 2007

(65) Prior Publication Data

US 2007/0248511 A1    Oct. 25, 2007

Related U.S. Application Data

(60) Provisional application No. 60/793,900, filed on Apr. 21, 2006.

(51) Int. Cl.
*B60R 21/26* (2011.01)
*B60R 21/264* (2006.01)

(52) U.S. Cl. ........................ 280/741; 280/736
(58) Field of Classification Search ........ 280/736, 280/741; 422/164, 165, 166, 305
See application file for complete search history.

(56) References Cited

U.S. PATENT DOCUMENTS

| | | |
|---|---|---|
| 2,891,525 A | 6/1959 | Moore ................... 23/90.51 |
| 3,794,347 A | 2/1974 | Zens ....................... 280/150 |
| 3,877,882 A | 4/1975 | Lette et al. |
| 3,880,447 A | 4/1975 | Thorn et al. |
| 3,958,949 A | 5/1976 | Plantif et al. |
| 3,985,076 A | 10/1976 | Schneiter et al. |
| 4,001,750 A | 1/1977 | Scherer et al. ............. 337/280 |
| 4,012,189 A | 3/1977 | Vogt et al. ................. 431/353 |
| 4,215,631 A | 8/1980 | Rucker ....................... 102/27 |
| 4,530,516 A | 7/1985 | Adams et al. ............... 280/741 |
| 4,611,374 A | 9/1986 | Schnelle et al. .......... 29/890.13 |
| 4,730,558 A | 3/1988 | Florin et al. ................ 102/218 |
| 4,762,067 A | 8/1988 | Barker et al. .............. 102/313 |
| 4,950,458 A | 8/1990 | Cunningham ............... 422/164 |
| 5,028,070 A | 7/1991 | Bender |
| 5,048,862 A | 9/1991 | Bender et al. |
| 5,308,370 A * | 5/1994 | Kraft et al. ................... 55/487 |
| 5,318,323 A | 6/1994 | Pietz |
| 5,333,656 A | 8/1994 | Mackal ...................... 141/330 |
| 5,372,449 A | 12/1994 | Bauer et al. ................ 403/273 |
| 5,387,009 A | 2/1995 | Lauritzen et al. |

(Continued)

FOREIGN PATENT DOCUMENTS

| | | |
|---|---|---|
| DE | 40 19 877 A1 | 6/1990 |
| DE | 42 27547 A1 | 2/1994 |

(Continued)

OTHER PUBLICATIONS

Office Action U.S. Appl. No. 12/290,556, filed Oct. 31, 2008, Mailed May 11, 2010 (193).

(Continued)

*Primary Examiner* — Drew Brown
*Assistant Examiner* — Barry Gooden, Jr.
(74) *Attorney, Agent, or Firm* — L.C. Begin & Associates, PLLC.

(57) ABSTRACT

A gas generating system is provided including a first housing formed from a polymeric material, and a pyrotechnic gas generant material contained in the first housing. The first housing forms a combustion chamber for the gas generant. An airbag system and a vehicle occupant protection system, each incorporating a gas generating system as described herein, are also disclosed.

19 Claims, 2 Drawing Sheets

U.S. PATENT DOCUMENTS

| | | | | |
|---|---|---|---|---|
| 5,443,286 | A | | 8/1995 | Cunningham et al. |
| 5,464,249 | A | * | 11/1995 | Lauritzen et al. ............ 280/741 |
| 5,509,686 | A | | 4/1996 | Shepherd et al. ............ 280/738 |
| 5,516,147 | A | | 5/1996 | Clark et al. .................... 280/737 |
| 5,533,751 | A | | 7/1996 | Kort et al. ..................... 280/737 |
| 5,551,724 | A | * | 9/1996 | Armstrong et al. ........... 280/737 |
| 5,553,889 | A | * | 9/1996 | Hamilton et al. .............. 280/736 |
| 5,562,304 | A | | 10/1996 | Gest |
| 5,564,743 | A | | 10/1996 | Marchant ...................... 280/741 |
| 5,582,427 | A | | 12/1996 | Rink et al. ..................... 280/740 |
| 5,588,676 | A | | 12/1996 | Clerk et al. .................... 280/741 |
| 5,611,566 | A | | 3/1997 | Simon et al. ................... 280/736 |
| 5,613,703 | A | | 3/1997 | Fischer ......................... 280/741 |
| 5,622,380 | A | | 4/1997 | Khandhadia et al. ......... 280/736 |
| 5,624,133 | A | | 4/1997 | Wong |
| 5,628,528 | A | | 5/1997 | DeSautelle et al. ........... 280/736 |
| 5,630,619 | A | | 5/1997 | Buchanan et al. ............. 280/741 |
| 5,662,722 | A | | 9/1997 | Shiban ............................ 55/413 |
| 5,725,245 | A | | 3/1998 | O'Driscoll et al. |
| 5,799,973 | A | | 9/1998 | Bauer et al. .................... 280/741 |
| 5,813,695 | A | | 9/1998 | O'Driscoll et al. |
| 5,845,935 | A | | 12/1998 | Enders et al. ............... 280/743.2 |
| 5,860,672 | A | | 1/1999 | Petersen ..................... 280/728.2 |
| 5,872,329 | A | | 2/1999 | Burns et al. ..................... 149/36 |
| 5,934,705 | A | | 8/1999 | Siddiqui et al. ............... 280/736 |
| 5,941,562 | A | | 8/1999 | Rink et al. ..................... 280/741 |
| 5,970,880 | A | | 10/1999 | Perotto ........................... 102/531 |
| 6,019,389 | A | | 2/2000 | Burgi et al. ................... 280/736 |
| 6,029,994 | A | * | 2/2000 | Perotto et al. ................. 280/736 |
| 6,032,979 | A | | 3/2000 | Mossi et al. ................... 280/741 |
| 6,068,292 | A | * | 5/2000 | Renz .............................. 280/737 |
| 6,074,502 | A | * | 6/2000 | Burns et al. ..................... 149/36 |
| 6,095,556 | A | | 8/2000 | Bailey et al. .................. 280/737 |
| 6,095,559 | A | | 8/2000 | Smith et al. |
| 6,095,561 | A | | 8/2000 | Siddiqui et al. ............... 280/472 |
| 6,106,000 | A | | 8/2000 | Stewart ....................... 280/728.2 |
| 6,116,491 | A | | 9/2000 | Katoh ................................ 28/42 |
| 6,149,193 | A | | 11/2000 | Canterberry et al. ......... 280/741 |
| 6,210,505 | B1 | | 4/2001 | Khandhadia et al. ........... 149/36 |
| 6,244,623 | B1 | | 6/2001 | Moore et al. .................. 280/471 |
| 6,379,627 | B1 | | 4/2002 | Nguyen et al. |
| 6,464,254 | B2 | | 10/2002 | Chikaraishi et al. .......... 280/741 |
| 6,485,053 | B2 | | 11/2002 | Fujimoto ....................... 280/741 |
| 6,553,914 | B2 | * | 4/2003 | Hosey et al. .................. 102/530 |
| 6,755,438 | B2 | * | 6/2004 | Rink et al. ..................... 280/737 |
| 6,776,434 | B2 | | 8/2004 | Ford et al. ..................... 280/729 |
| 6,851,705 | B2 | | 2/2005 | Young et al. |
| 6,854,764 | B2 | * | 2/2005 | Larsen et al. .................. 280/741 |
| 6,860,510 | B2 | * | 3/2005 | Ogawa et al. ................. 280/736 |
| 6,908,104 | B2 | | 6/2005 | Canterberry et al. ......... 280/736 |
| 6,935,655 | B2 | | 8/2005 | Longhurst et al. ............ 280/736 |
| 6,945,561 | B2 | | 9/2005 | Nakashima .................... 280/736 |
| 6,976,702 | B2 | | 12/2005 | Yokota et al. ............... 280/730.2 |
| 7,052,040 | B2 | | 5/2006 | Matsuda et al. ............... 280/741 |
| 7,073,820 | B2 | | 7/2006 | McCormick ................... 280/741 |
| 7,178,829 | B2 | | 2/2007 | Blackburn ..................... 280/736 |
| 7,178,830 | B2 | | 2/2007 | Blackburn ..................... 280/736 |
| 7,343,862 | B2 | | 3/2008 | McCormick ................... 102/530 |
| 7,367,584 | B2 | | 5/2008 | Blackburn ..................... 280/736 |
| 7,654,565 | B2 | | 2/2010 | McCormick et al. ......... 280/736 |
| 2002/0145275 | A1 | * | 10/2002 | Hosey et al. ................... 280/741 |
| 2003/0201628 | A1 | | 10/2003 | Choudhury et al. |
| 2004/0046373 | A1 | | 3/2004 | Wang et al. |
| 2004/0124619 | A1 | * | 7/2004 | Lewis et al. ................... 280/741 |
| 2005/0082804 | A1 | * | 4/2005 | Khandhadia ................... 280/736 |
| 2005/0110253 | A1 | * | 5/2005 | Khandhadia et al. ......... 280/736 |
| 2005/0134031 | A1 | * | 6/2005 | McCormick ................... 280/741 |
| 2005/0194772 | A1 | | 9/2005 | Numoto et al. |
| 2005/0212271 | A1 | * | 9/2005 | Adamini et al. .............. 280/736 |
| 2005/0230949 | A1 | | 10/2005 | Blackburn |
| 2005/0263993 | A1 | | 12/2005 | Blackburn |
| 2005/0263994 | A1 | | 12/2005 | Quioc |
| 2005/0280252 | A1 | * | 12/2005 | McCormick ................... 280/741 |
| 2006/0001246 | A1 | * | 1/2006 | Gotoh et al. ................... 280/736 |
| 2006/0005734 | A1 | | 1/2006 | McCormick |
| 2006/0043716 | A1 | | 3/2006 | Quioc |
| 2006/0157961 | A1 | * | 7/2006 | Burns ............................. 280/736 |
| 2006/0261584 | A1 | | 11/2006 | Blackburn |

FOREIGN PATENT DOCUMENTS

| | | |
|---|---|---|
| EP | 0602785 B1 | 2/1993 |
| EP | 0728633 A1 | 2/1996 |
| EP | 0844149 A1 | 11/1997 |
| EP | 0864470 A1 | 9/1998 |
| EP | 1122134 B1 | 7/2000 |
| EP | 1308353 A2 | 9/2002 |
| JP | 05096147 | 4/1993 |
| WO | WO 98/39183 | 9/1998 |
| WO | WO 2004/091982 A1 | 10/2004 |
| WO | WO 2005/058645 A2 | 6/2005 |
| WO | 2005/086917 | 9/2005 |
| WO | 2006/044516 A2 | 4/2006 |
| WO | 2006/078819 A2 | 4/2006 |

OTHER PUBLICATIONS

Office Action U.S. Appl. No. 12/290,556, filed Oct. 31, 2008, Mailed Nov. 23, 2010 (193).

Office Action U.S. Appl. No. 12/655,768, filed Jan. 7, 2010, Mailed Oct. 1, 2010 (02125).

* cited by examiner

GAS GENERATING SYSTEM

CROSS REFERENCE TO RELATED APPLICATIONS

This application claims the benefit of provisional application Ser. No. 60/793,900 filed on Apr. 21, 2006.

BACKGROUND OF THE INVENTION

The present invention relates generally to gas generating systems for use in inflatable occupant protection systems in motor vehicles.

Installation of inflatable occupant protection systems, generally known as "airbags," as standard equipment in all new vehicles has intensified the search for smaller, lighter and less expensive protection systems. Accordingly, since the gas generating system used in such systems tends to be the heaviest and most expensive component, there is a need for a lighter and less expensive gas generating system.

Extensive use of metals such as steel in the structure of the gas generating system also adds to the weight of the gas generating system. In addition, gas generator housings may be formed from materials such as aluminum. These relatively lightweight materials can lose strength at abnormally high temperatures, such as those reached in a vehicle fire. At temperatures experienced in a vehicle fire, the gas generating material may autoignite and produce inflation fluid at a pressure sufficient to cause the inflator housing to lose its structural integrity due to the reduced strength of the inflator housing material. To prevent such loss of structural integrity, inflators typically include an autoignition material that will autoignite and initiate combustion of the gas generating material at a temperature below that at which the material of the housing begins to lose a significant percentage of its strength. However, the provision and positioning of this autoignition material in the gas generator adds to the component and assembly costs of the gas generating system.

SUMMARY OF THE INVENTION

A gas generating system is provided including a first housing formed from a polymeric material, and a pyrotechnic gas generant material contained in the first housing. The first housing forms a combustion chamber for the gas generant.

In yet another aspect of the invention, an airbag system is also provided which includes at least one airbag, and a gas generating system as described herein.

In yet another aspect of the invention, a vehicle occupant protection system is provided including a gas generating system as described herein.

DETAILED DESCRIPTION

Figure 1:
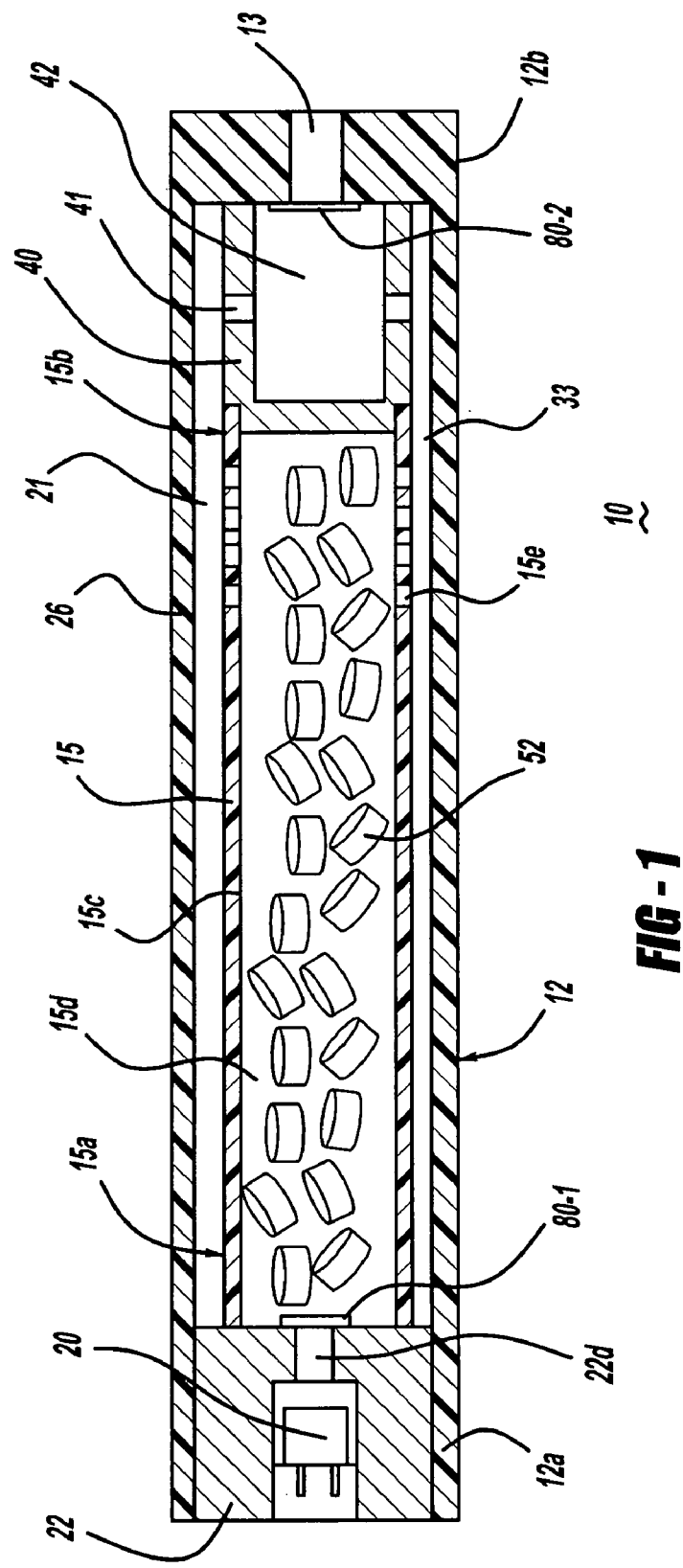
FIG. 1 is a cross-sectional side view of one embodiment of a gas generating system in accordance with the present invention.

FIG. 1 shows one embodiment of a gas generating system 10 in accordance with the present invention. Gas generating system 10 includes a substantially cylindrical outer housing 12 having a pair of opposed ends 12a, 12b and a wall 26 extending between the ends to define a housing interior cavity 21. However, outer housing 12 may be formed in any one of a variety of suitable shapes, according to design requirements. Outer housing 12 may be formed from a metallic material, a polymer, or any other material suitable for the application described herein. In a particular embodiment, outer housing 12 is formed from a polymer material using a molding process, extrusion process, or other suitable polymer processing method. Housing second end 12b includes at least one gas exit aperture 13 to enable fluid communication between an interior of the housing and an exterior of the housing. In one embodiment, aperture 13 enables fluid communication between the interior of the housing and an associated inflatable element (for example, a vehicle airbag) (not shown)) operatively coupled to the gas generating system.

Outer housing 12 encloses and/or provides structural support for the other elements of the gas generating system. In the polymeric embodiment, outer housing 12 may be formed from a material having a substantially amorphous structure, from a material having a substantially crystalline structure, or from a material having a combination of amorphous and crystalline regions, according to design requirements. Generally, the outer housing polymeric material should have sufficient strength and a sufficiently high melt temperature to enable its structural integrity to be maintained at the elevated pressures and temperatures experienced during ignition and combustion of the gas generant contained in the housing (as described below in greater detail), for at least long enough to enable completion of the combustion reaction and flow of the generated gases out of the gas generating system and into an associated inflatable device. In one particular embodiment, outer housing 12 is formed from a polymer material having a relatively high degree of crystallinity, due to the fact that the melting point of such a material is generally more clearly defined than the melting point of a predominantly amorphous material. In another particular embodiment, outer housing 12 is formed from a polymer material having a relatively low melting temperature, generally within the range 125° C.-200° C., thereby permitting the outer housing to melt relatively quickly when exposed to a flame or elevated temperature and exposing the inner housing 15 to the flame or elevated temperature. Examples of polymers suitable for use in outer housing 12 include, for example, Nylon 6 (polyamide), Nylon 6/6 (polyamide), Polyetheretherketones (PEEK), or other similar compositions. Nylon 6 and Nylon 6/6 are commercially available from DuPont® or from a variety of other vendors. Other examples of polymers suitable for use in outer housing 12 (depending on the requirements of a particular design) are various formulations of polyethylene and polypropylene.

The present invention includes a housing assembly for use in a gas generating system, the assembly including a polymeric inner housing 15 adapted for positioning within outer housing 12 of the gas generating system, and a pyrotechnic gas generant material 52 (described in greater detail below) contained in the inner housing. In the embodiment shown in FIG. 1, inner housing 15 is substantially cylindrical and is positioned spaced apart from outer housing 12 so as to form a fluid flow passage 33 extending between the outer housing and the inner housing. However, inner housing 15 may be formed in any one of a variety of suitable shapes, according to design requirements. Inner housing 15 has a pair of opposed ends 15a, 15b and a wall 15c extending between the ends to define a housing interior cavity 15d which serves as a combustion chamber for gas generant 52. Inner housing includes one or more gas exit apertures 15e formed therein for enabling fluid communication between interior cavity 15d and gas exit aperture 13 of outer housing 12. In the particular embodiment shown in FIG. 1, inner housing 15 has a plurality of gas exit apertures 15e spaced circumferentially about housing second end 15b. Also, in the particular embodiment shown in FIG. 1, gas exit apertures 15e provide fluid communication between inner housing cavity 15d and fluid flow passage 33, and a baffle 40 (described in greater detail below) is positioned along a fluid flow path between inner housing cavity 15d and gas exit aperture 13, for cooling generated gases and accumulating particulates from the gases prior to flow of the gases from outer housing 12. However, the gas generating system may be constructed without a baffle.

Inner housing 15 is formed from a polymer material using a molding process, extrusion process, or other suitable polymer processing method. In an embodiment in which both the outer and inner housings are polymeric, the inner and outer housings may be formed from the same material, or from different materials. Inner housing 15 may be formed from a material having a substantially amorphous structure, from a material having a substantially crystalline structure, or from a material having a combination of amorphous and crystalline regions, according to design requirements. Generally, the inner housing material should have sufficient strength and a sufficiently high melt temperature to enable its structural integrity to be maintained at the elevated pressures and temperatures experienced during ignition and combustion of the gas generant contained in the housing (as described below in greater detail), for at least long enough to enable completion of the combustion reaction and flow of the generated gases out of the inner housing. In one particular embodiment, inner housing 15 is formed from a polymer material having a relatively high degree of crystallinity, due to the fact that the melting point of such a material is generally more clearly defined than the melting point of a predominantly amorphous material. In another particular embodiment, the inner housing is formed from a material having a melting temperature that is below a desired auto-ignition temperature of a gas generant 52 contained therein (as described in greater detail below) positioned in the inner housing. This permits melting of the housing material to provide access of a flame to the gas generant material. In a particular embodiment, inner housing 15 is formed from a polymer material having a relatively low melting temperature, generally within the range 125° C.-200° C. Examples of polymers suitable for use in inner housing 15 include, for example, Nylon 6 (polyamide), Nylon 6/6 (polyamide), Polyetheretherketones (PEEK), or other similar compositions. Nylon 6 and Nylon 6/6 are commercially available from DuPont® or from a variety of other vendors. Other examples of polymers suitable for use in inner housing 15 (depending on the requirements of a particular design) are various formulations of polyethylene and polypropylene.

In one particular embodiment, the polymer material or materials used for outer housing 12 and/or inner housing 15 are selected so as to have sufficient tensile strength and elongation to permit a degree of flexing or expansion of the inner and/or outer housings to accommodate internal pressure variations during gas generating system deployment. The ability of the material (or materials) to flex to accommodate pressure fluctuations enables the wall thickness of each housing to be optimized, thereby providing further savings in material costs and reduction in weight.

During operation, the amount of time required for gas generant ignition, combustion, and deployment of the generated gases is much shorter than the amount of time required to melt or thermally degrade the materials of the inner housing or outer housing. Thus, it is believed that polymeric inner and outer housings will perform their functions before a function-impairing thermal degradation of the material can occur. Dimensions (for example, wall thickness) of housings 12 and 15 and the type and exact formulation of the material used for each polymeric housing may be iteratively determined based on polymer material properties, the time required for thermal degradation of the material when exposed to the temperatures and pressures resulting from combustion of a particular gas generant, the time required for generation and deployment of the gases, and other pertinent design factors.

An end closure 22 is secured to end 12a of outer housing 12. End closure 22 may be stamped, cast, or otherwise metal formed and may be made from carbon steel or stainless steel, for example. End closure 22 is secured to end 12a of housing 12 using one or more known methods, for example by ultrasonic welding or through adhesive application. Referring to FIG. 1, end closure 22 has a central orifice 22d for mounting an initiator 20 therein and for enabling fluid communication between the initiator combustion products and combustion chamber 15d after activation of the initiator, to initiate combustion of gas generant 52.

Referring again to FIG. 1, initiator 20 is coupled to housing 12 for initiating combustion of gas generant material 52 upon activation of the gas generating system. In one embodiment, initiator 20 is secured in central orifice 22d of end closure 22 by the use of crimping, fasteners, or other known methods. One example of an initiator suitable for use in the gas generating system of the present invention is described in U.S. Pat. No. 6,009,809, incorporated herein by reference.

A baffle 40 includes one or more orifices 41 for receiving gases into a central chamber 42 thereof from flow passage 33, to aid in cooling and removing particulates from the generated gases. Baffle 40 is positioned along a fluid flow path between inner housing combustion chamber 15d and outer housing gas exit aperture 13. Baffle 40 is configured and located so as to enable fluid communication between central chamber 42 and housing end orifice 13 upon activation of the gas generator, thereby providing a flow path for generated gases from flow passage 33 to housing end orifice 13. Baffle 40 is fabricated (for example, by stamping or some other suitable process) from a rigid material such as carbon steel, stainless steel, or a suitable polymer material. In the embodiment shown in FIG. 1, baffle 40 is secured to outer housing 12 using any of a variety of known methods, such as ultrasonic welding or adhesive application. The method used to secure baffle 40 to outer housing 12 (or to other components of the gas generating system) should provide a joint of sufficient strength to withstand the heat and forces produced by the flow of high-pressure combustion products through and out of the gas generating system.

Gas generant material 52 is positioned within inner housing cavity 15d and may be any known gas generant material useful for airbag application and is exemplified by, but not limited to, compositions and processes described in U.S. Pat. Nos. 5,035,757, 5,872,329, 6,074,502, 6,287,400, 6,306,232 and 6,475,312 each incorporated by reference herein. Other suitable materials are set forth in the U.S. Patent Application Ser. Nos. 10/407,300 and 60/369,775, incorporated by reference herein.

If desired, a filter (not shown) may be positioned within central baffle chamber 42 or otherwise along a flow path of gases between inner housing chamber 15d and housing gas exit aperture 13, for filtering particulates from gases generated by combustion of gas generant 52. The filter may be formed from one of a variety of materials (for example, a carbon fiber, metallic mesh, perforated sheet, or a compressed knitted metal wire) known in the art for filtering gas generant combustion products. Suitable metallic mesh is readily obtainable from suppliers such as Wayne Wire, Inc., of Kalkaska, Mich. Suitable compressed knitted metal wire is commercially available from vendors such as Metex Corp. of Edison, N.J.

If desired, rupturable, fluid-tight seals such as 80-1 and 80-2 may be positioned across housing aperture 13, at an end of end closure orifice 22d, and/or across any of inner housing openings 15e. Various known disks, foils, films, etc. may be used to form the seals.

Operation of the gas generating system will now be discussed with reference to FIG. 1. Upon activation of the gas generating system, combustion products from initiator 20 rupture seal 80-1 and ignite gas generant material 52 contained in chamber 15d of inner housing 15. Combustion products generated by combustion of gas generant 52 exit inner housing openings 15e and propagate along flow passage 33, entering baffle openings 41. Increasing pressure within baffle chamber 42 causes seal 80-2 to rupture, releasing the combustion gases through housing end aperture 13.

As stated previously, during operation, the amount of time required for gas generant ignition, combustion, and deployment of the generated gases is much shorter than the amount of time required to melt or thermally degrade the materials forming the inner housing and any polymeric version of the outer housing. Thus, the polymeric housings will perform their functions before a function-impairing thermal degradation of the material can occur.

It may be seen from the above description that formation of the inner housing and (optionally) the outer housings of the gas generator from polymer materials provides several important advantages. The use of polymer materials for the housing(s) and other components of the gas generating system reduces the weight and cost of the system. The wall thicknesses and other pertinent dimensions of the inner and outer housings may also be optimized for a particular gas generant material, providing further savings in weight and material cost. Because the present invention does not require the crimping and/or welding of components necessary with conventional gas generating systems, the assembly cost of the system is reduced. Also, exposure to intense external heat or flame will either soften and melt, or burn through, the polymer housing material(s), enabling ignition of the gas generant without the need to incorporate an autoignition material in the housing, thus further reducing component and manufacturing costs.

Figure 2:
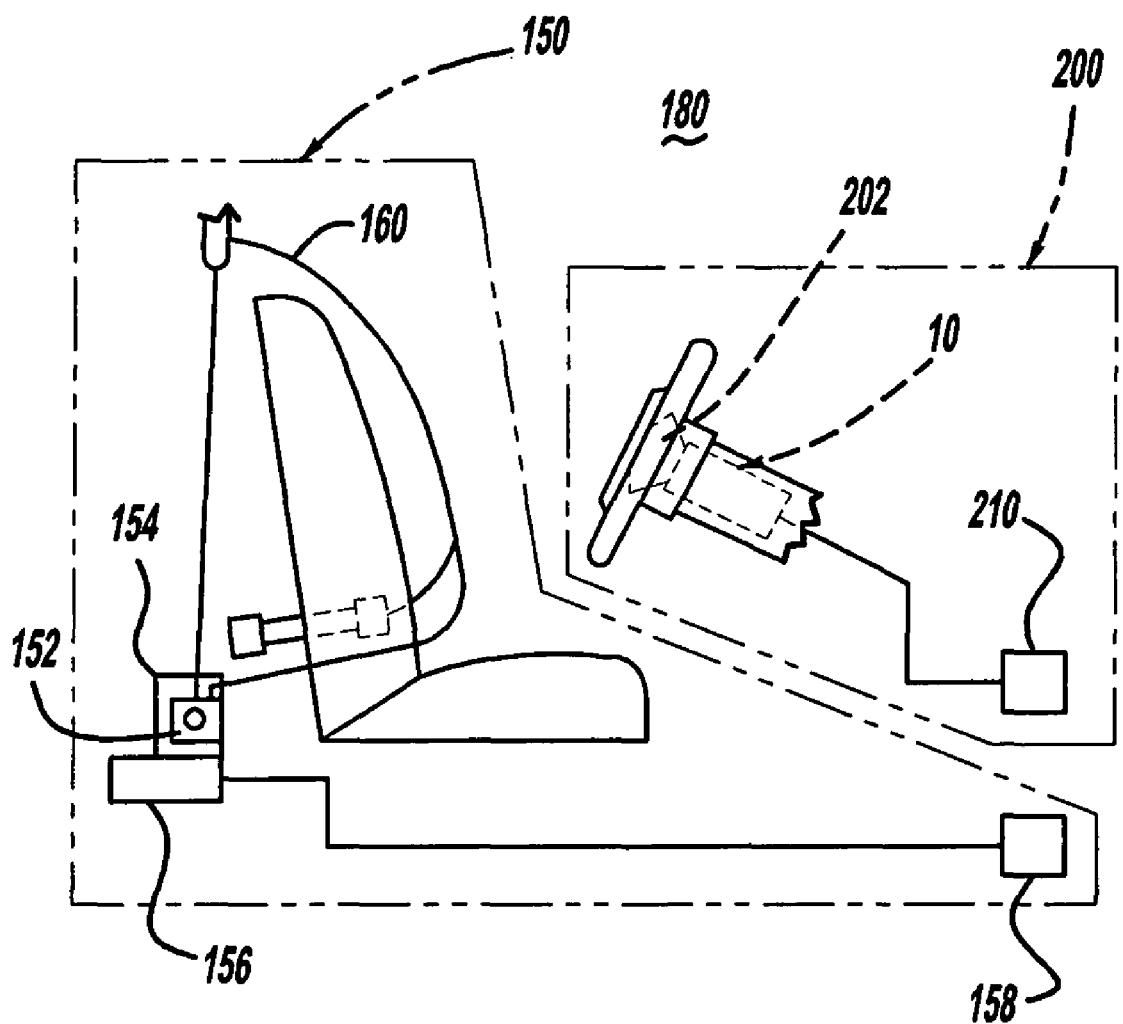
FIG. 2 is a schematic representation of an exemplary vehicle occupant protection system incorporating a gas generating system in accordance with the present invention.

Any of the gas generating system embodiments described above may be incorporated into an airbag system, such as a driver-seat, passenger-seat, driver-side, or passenger-side airbag system. FIG. 2 shows a particular embodiment wherein the gas generating system is incorporated into a driver-seat airbag system 200. Airbag system 200 includes at least one airbag 202 and a gas generating system 10 (in accordance with the present invention) coupled to airbag 202 so as to enable fluid communication with an interior of the airbag upon activation of the gas generating system. Airbag system 200 may also include (or be in communication with) a crash event sensor 210. In a known manner, crash event sensor 210 operates in conjunction with a crash sensor algorithm that signals actuation of airbag system 200 via, for example, activation of airbag gas generating system 10 in the event of a collision.

Referring again to FIG. 2, a gas generating system as described herein and/or an airbag system including such a gas generating system may also be incorporated into a broader, more comprehensive vehicle occupant protection system 180 including additional elements such as a safety belt assembly 150. FIG. 2 shows a schematic diagram of one exemplary embodiment of such a protection system. Safety belt assembly 150 includes a safety belt housing 152 and a safety belt 160 extending from housing 152. A safety belt retractor mechanism 154 (for example, a spring-loaded mechanism) may be coupled to an end portion of the belt. In addition, a safety belt pretensioner 156 may be coupled to belt retractor mechanism 154 to actuate the retractor mechanism in the event of a collision. Typical safety belt retractor mechanisms which may be used in conjunction with the safety belt embodiments of the present invention are described in U.S. Pat. Nos. 5,743,480, 5,553,803, 5,667,161, 5,451,008, 4,558, 832 and 4,597,546, incorporated herein by reference. Illustrative examples of typical pretensioners with which the safety belt embodiments of the present invention may be combined are described in U.S. Pat. Nos. 6,505,790 and 6,419,177, incorporated herein by reference.

Safety belt assembly 150 may also include (or be in communication with) a crash event sensor 158 (for example, an inertia sensor or an accelerometer) which incorporates (or is operatively coupled to) a crash sensor algorithm that signals actuation of belt pretensioner 156 via, for example, activation of a pyrotechnic igniter (not shown) incorporated into the pretensioner. U.S. Pat. Nos. 6,505,790 and 6,419,177, previously incorporated herein by reference, provide illustrative examples of pretensioners actuated in such a manner.

It will be understood that the foregoing descriptions of embodiments of the present invention are for illustrative purposes only. As such, the various structural and operational features herein disclosed are susceptible to a number of modifications commensurate with the abilities of one of ordinary skill in the art, none of which departs from the scope of the present invention as defined in the appended claims.

What is claimed is:

1. A gas generating system comprising:
a polymeric first housing defining an interior;
a second housing having at least a portion of the first housing positioned therein, the second housing being spaced apart from the first housing;
a baffle enclosed within the second housing,
an annular fluid flow passage defined by the first housing and the baffle along a first side of the passage and by the second housing along an opposite side of the passage;
the baffle incorporating means for preventing a flow of gas from the first housing interior directly into an interior of the baffle both before and after generation of a gas within the first housing interior.

2. The gas generating system of claim 1 wherein the first housing is in direct contact with the baffle.

3. The gas generating system of claim 1 fluid communication between the interior of the first housing and the baffle chamber opening is provided only by the annular flow passage.

4. The gas generating system of claim 1 wherein the baffle is positioned such that gases exiting the first housing flow directly into the passage and contact the second housing prior to contacting the baffle.

5. The gas generating system of claim 1 wherein an exterior surface of the first housing is coplanar with an exterior surface of the baffle.

6. The gas generating system of claim 1 wherein the baffle includes a first portion and a wall extending from the first portion, the first portion and the wall defining the interior of the baffle, and wherein the means for preventing a flow of gas from the first housing directly into the interior of the baffle comprises the baffle first portion.

7. The gas generating system of claim 1 wherein the baffle is positioned such that all gases generated in the first housing are directed radially outwardly from the first housing into the flow passage, then toward the baffle, then radially inwardly through the at least one opening into the baffle chamber.

8. An airbag system comprising:
at least one airbag; and
a gas generating system in accordance with claim 1.

9. A vehicle occupant protection system including a gas generating system in accordance with claim 1.

10. The gas generating system of claim 1 wherein the baffle has a first opening directly connecting the flow passage and an interior of the baffle.

11. The gas generating system of claim 10 wherein the second housing includes at least one first gas exit aperture for enabling fluid communication between an interior of the second housing and an exterior of the second housing after activation of the gas generating system, and wherein the baffle defines at least one opening separate from the first opening for enabling fluid communication between the baffle chamber and the at least one first gas exit aperture after activation of the gas generating system.

12. A gas generating system comprising:
a polymeric first housing;
a second housing having at least a portion of the first housing positioned therein, the second housing being spaced apart from the first housing;
so as to define an annular fluid flow passage extending therebetween; and
a baffle enclosed within the second housing, the baffle defining a baffle chamber and having an opening enabling fluid communication between the flow passage and the baffle chamber;
the baffle incorporating means for preventing a flow of gas from the first housing directly into the baffle chamber both before and after generation of a gas within the first housing;
wherein all of the gases generated in the first housing are directed radially outwardly from the first housing, then toward the baffle, then radially inwardly into the baffle chamber.

13. A gas generating system comprising:
a polymeric first housing;
a second housing, spaced apart from the first housing;
a baffle having at least a portion thereof positioned within the second housing, the baffle including a first portion and a wall extending from the first portion, the first portion and the wall defining a baffle chamber,
an annular fluid flow passage defined by the first housing and the baffle wall along a first side of the passage and by the second housing along an opposite side of the passage;
the baffle having at least one opening formed in the wall, the at least one opening directly connecting the chamber with the flow passage.

14. The gas generating system of claim 13 wherein the baffle is positioned such that all the gases generated in the first housing are directed radially outwardly from the first housing into the flow passage, then toward the baffle, then radially inwardly through the at least one opening into the baffle chamber.

15. The gas generating system of claim 13 wherein the first housing is in direct contact with the baffle.

16. The gas generating system of claim 13 wherein the first portion is configured to prevent a flow of the gas therethrough directly from the first housing into the chamber both before and after generation of the gas within the first housing.

17. The gas generating system of claim 13 wherein the gases exiting the first housing contact the second housing prior to contacting the baffle element.

18. A vehicle occupant protection system including a gas generating system in accordance with claim 13.

19. An airbag system comprising:
at least one airbag; and
a gas generating system in accordance with claim 13.

* * * * *